R. F. MIEHLE, Jr.
CHANGE SPEED TRANSMISSION MECHANISM.
APPLICATION FILED MAR. 14, 1919.

1,382,526.

Patented June 21, 1921.

Inventor
Robert F. Miehle, Jr.
By
Miehle & Miehle
Attorneys

UNITED STATES PATENT OFFICE.

ROBERT FRANK MIEHLE, JR., OF CHICAGO, ILLINOIS.

CHANGE-SPEED TRANSMISSION MECHANISM.

1,382,526.     Specification of Letters Patent.     Patented June 21, 1921.

Application filed March 14, 1919. Serial No. 282,555.

*To all whom it may concern:*

Be it known that I, ROBERT F. MIEHLE, Jr., a citizen of the United States, residing at Chicago, in the county of Cook and State of Illinois, have invented a certain new and useful Improvement in Change-Speed Transmission Mechanisms, of which the following is a full, clear, concise, and exact description, reference being had to the accompanying drawings, forming a part of this specification.

My invention relates to change speed transmission mechanisms, particularly to change speed transmission mechanisms for automobiles, although not limited to this use alone.

My invention relates to change speed transmission mechanism employing sets of intermeshing toothed coupling elements to effect the transmission of the different speeds and has for its main feature the provision of such mechanism which will aid in the shifting of the coupling elements into mesh when the relative rotative speeds thereof are in proper relation whereby undue clashing and possible harm to the coupling elements may be prevented. I accomplish this by the provision of means which normally prevents the coupling elements from being engaged until certain predetermined rotative relations of the coupling elements have taken place as hereinafter set forth in detail.

Another feature relates to the incorporation of such an indicating device embodying locking elements in a sliding coupling element change speed transmission mechanism and in its combination with the usual slidable coupling elements thereof with a view toward simplicity, compactness, and east of manipulation of the coupling elements to effect the change of speeds.

Another feature relates to the provision in a transmission of the above-described character of a shifting device which permits the actuation of the shifting device to the position of the desired speed even though the coupling elements are prevented from meshing, the shifting device delaying the effect of its movement into such position until such time as the coupling elements are permitted to mesh.

With these features in view my invention consists in certain features of novelty in the construction, combination and arrangement of parts by which the said features and certain other features hereinafter appearing are effected all as fully described with reference to the accompanying drawings and more particularly pointed out in the claims.

In the said drawings

Figs. 13 and 14 are diagrammatical views showing the movement of the lock arms as operating with over-running clutch coupling elements.

Like characters of reference indicate like parts in the various views.

Figure 1:
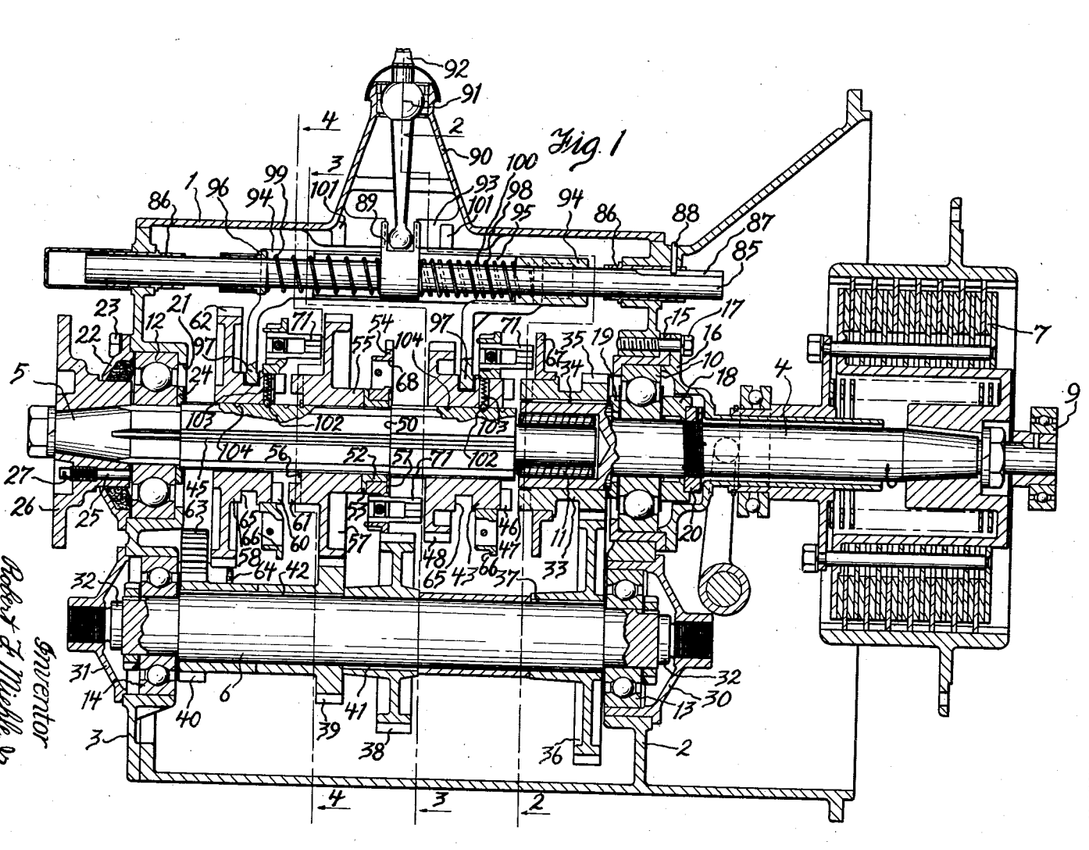
Figure 1 is a longitudinal vertical sectional view of a transmission mechanism embodying the preferred form of my invention.
Figure 2:
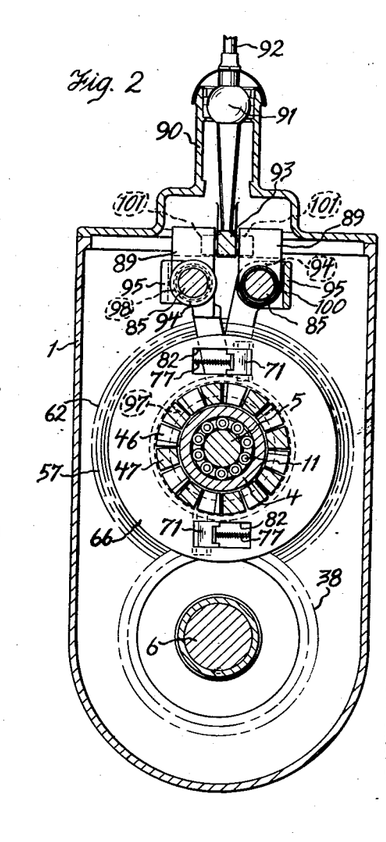
Fig. 2 is a transverse sectional view on the line 2—2 of Fig. 1.
Figures 3, 4, 5, 6:
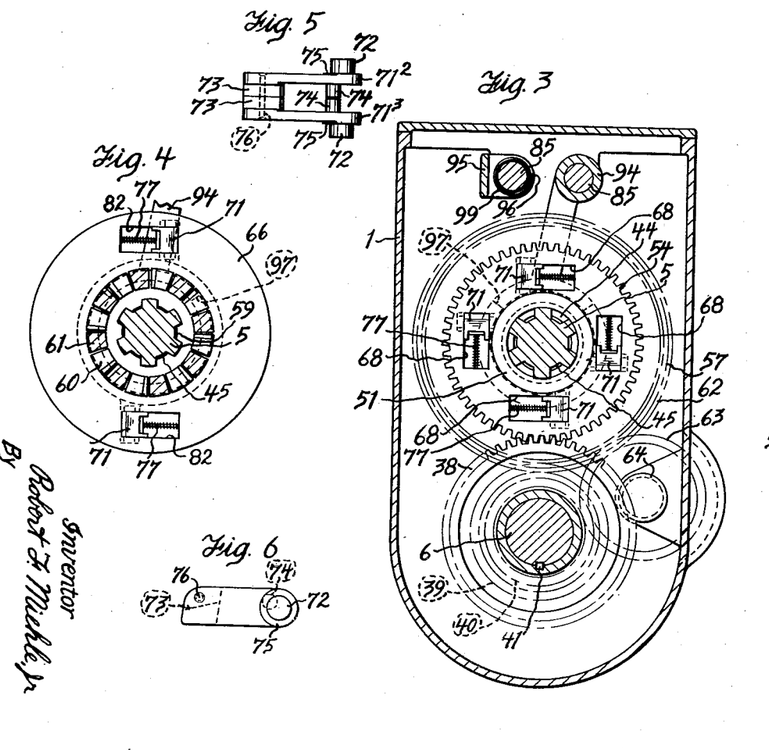
Fig. 3 is a transverse sectional view on the line 3—3 of Fig. 1.
Fig. 4 is a partial transverse sectional view on the line 4—4 of Fig. 1.
Fig. 5 is an enlarged detail view in side elevation of one of the lock arms hereinafter described.
Fig. 6 is an enlarged detail view in top plan elevation of the same.

Referring to the drawings 1 indicates a transmission casing provided with a front end wall 2 and a rear end wall 3. Arranged in the casing 1, in a manner to be more fully described, is a driving shaft 4 and a driven shaft 5 alined therewith and a countershaft 6 disposed in parallelism with the shafts 4 and 5. The driving shaft 4 is connected to a prime mover, not shown, through a usual friction clutch mechanism 7 disposed at the forward end of the driving shaft 4 which extends forward of the front end wall 2. The forward end of the driving shaft 4 is supported by a bearing 9 and the rear end thereof is supported by a bearing 10 mounted on the front end wall 2. The rear end of the driving shaft 4 extends rearwardly of the front end wall 2 and is enlarged and bored concentrically to accommodate a roller bearing 11. The front end of the driven shaft 5 is reduced and is supported by the roller bearing 11 and the rear end thereof is supported by a bearing 12 mounted on the rear end wall 3. The counter shaft 6 is supported below the shafts 4 and 5 in bearings 13 and 14 mounted respectively in the front end wall 2 and the rear end wall 3. The bearing 10 is preferably of the annular ball bearing type, the outer race of which is mounted in the end wall 2 by a flanged cup 15 and cap 16 secured to said wall by headed screws 17 in the usual manner to provide support laterally and longitudinally of the axis of the bearing, and the inner race of which is tightly fitted upon the small portion of the shaft 4 just in front of the enlarged portion thereof and secured longitudinally of its axis between collars 18 and 19 and against the shoulder formed at the forward end of the enlarged portion of the shaft by a nut 20 screw threaded upon the small portion of the shaft. This construction provides a lateral and longitudinal bearing for the shaft 4. The bearing 12 is also preferably of the annular ball bearing type, the outer race of which is mounted in a flanged aperture 21 of the rear end wall 3 and secured therein against the flange by a cap 22 secured to the end wall 3 by headed screws 23 as is usual, and the inner race of which is tightly fitted upon a small portion of the driven shaft 5 and secured against a collar 24 abutting a shoulder of the shaft by a plug 25 slidably mounted in a bore of a second collar 26, secured on said shaft on the side of said inner race opposite the collar 24, and an adjustment screw 27 screw threaded in the bore of said second collar and adapted to maintain said plug against the adjacent side of said inner race.
This construction provides a lateral and longitudinal bearing for the shaft 5. The counter shaft 6 is arranged below the shafts 4 and 5 in said bearings 13 and 14. The bearing 13 is arranged in a cap 30 suitably secured to the front end wall 2, and the bearing 14 is suitably mounted in the rear end wall 3. Another cap 31 is suitably secured to the rear end wall 3. The caps 30 and 31 are arranged around the respective ends of the counter shaft 6, and thrust buttons 32 are adjustably mounted in respective of said caps and engage the respective ends of the shaft 6 to resist the end thrust thereof.
Tightly fitted upon the enlarged end of the driving shaft 4 is a hub 33 which is secured thereto as to rotation by a key 34. Formed at the forward end of this hub is a spur gear pinion 35 which is constantly in mesh with a gear 36 tightly fitted upon the counter-shaft 6 and secured thereto as to rotation by a key 37. The counter-shaft has other gears 38, 39, and 40 tightly fitted thereon at proper intervals and secured thereto as to rotation by keys 41 and 42.
A hub 43 is mounted for sliding movement on the forward end of the driven shaft 5 and is secured therewith as to rotation by splines 44, see Fig. 4, formed in the bore of this hub engaging longitudinal grooves 45 formed in the shaft. The forward end of this hub is provided with teeth 46 which are adapted to be engaged with teeth 47, formed on the rear end of the hub 33, when the hub 43 is moved to its extreme forward position to form a positive driving connection between the shafts 4 and 5. The teeth of one of these hubs, and preferably the teeth of both, are beveled or backed off to provide an over-running clutch connection therebetween whereby the teeth will only engage when the driving shaft 4 is rotating faster in a forward direction than the driven shaft 5 or is rotating at the same speed when the teeth are in proper relation to engage. A gear 48 is formed at the rear end of the hub 43 and is adapted to mesh with gear 38 when the hub 43 is moved to its extreme rearward position, said gear 38 being so positioned that when the hub 43 is positioned at a point between its extreme forward and rearward positions there is considerable clearance between teeth 46 and teeth 47 and a similar clearance between gear 48 and gear 38, see Fig. 1.
The forward portion of the driven shaft 5 upon which the hub 43 is mounted is relatively large and terminates in a rearwardly facing shoulder 50, the rear portion of said shaft being smaller in diameter. Abutting this shoulder is a thrust washer 51, and disposed immediately adjacent the rear face of this washer is a collar 52 which is tightly fitted upon the shaft and which has a radial flange 53 formed at the rear end thereof. Mounted for rotation upon the collar 52 between the washer 51 and flange 53 is a gear 54 which is constantly in mesh with the rear portion of the gear 38, the front portion of these teeth being free to be meshed with the gear 48 as hereinbefore described. Mounted for rotation upon the driven shaft 5 and abutting the rear face of the flange 53 with its front end is a hub 55, and a split ring 56 sprung into a circumferential groove formed in the shaft engages the rear end of said hub, the flange 54 and the ring forming end thrust bearings for this hub. Formed on this hub 55 is a gear 57 constantly in mesh with gear 39 of the counter shaft.
A hub 58 is mounted for sliding movement on the driven shaft 5 just rearwardly of the hub 55 and is secured with the shaft as to rotation by splines 59 formed in the bore of this hub engaging the said longitudinal grooves 45 of the shaft 5. The forward end of this hub is provided with teeth 60 which are adapted to be engaged with teeth 61, formed on the rear end of the hub 55, when the hub 58 is moved to its extreme forward position to form a positive driving connection between the hub 55 and hub 58 which it will be noted is in driving connection with the driven shaft 5. The teeth of one of these hubs, and preferably the teeth of both, are beveled or backed off to provide an over-running clutch connection therebetween whereby the teeth will only engage when the hub 55 is rotating faster in a forward direction than the driven shaft 5 or is rotating at the same speed when the teeth are in proper relation to engage. Formed at the rear end of the hub 58 is a gear 62 which is adapted to mesh with a pinion 63, mounted for rotation on a stud 64 fixedly mounted on the casing 1 and constantly in mesh with gear 40 of the countershaft, when the hub 58 is moved to its extreme rearward position, said pinion 63 being so positioned that when the hub 43 is positioned at a point between its extreme forward and rearward positions there is considerable clearance between teeth 60 and teeth 61 and a similar clearance between gear 62 and pinion 63, see Fig. 1.

Each of the hubs 43 and 58 is provided with a circumferential groove 65 engaged by means hereinafter to be described to shift these hubs along the shaft 5 to vary the driving relation of the shafts 4 and 5. In explanation;—when the hub 58 is shifted forward to engage teeth 60 with teeth 61, as hereinbefore described, a driving connection is established through counter shaft 6 by the meshing gears 35 and 36 and the meshing gears 39 and 57 to drive the shaft 5 in the same direction as shaft 4 but at a reduced speed. When the hub 58 is shifted rearward to mesh the gear 62 with pinion 63, as hereinbefore described, a driving connection is established through counter-shaft 6 by the meshing gears 35 and 36 and the meshing gears 40, 63, and 62 to drive the shaft 5 in a direction reversely of the shaft 4 and at a reduced speed. When the hub 43 is shifted rearwardly to mesh the gear 48 with the gear 38 a driving connection is established through counter-shaft 6 by the meshing gears 35 and 36 and the meshing gears 48 and 38 to drive the shaft 5 in the same direction as shaft 4 but at a reduced speed. And when the hub 43 is shifted forwardly to engage teeth 46 with teeth 47, as hereinbefore described, a direct drive is established between shafts 4 and 5 to drive the shaft 5 in the same direction as shaft 4 and at the same speed, the gears 35 and 36 rotating the counter-shaft and its gears idly during this drive.

Each of the hubs 58 and 43 has a reduced cylindrical portion formed at its front end which terminates in a shoulder in front of the groove 65 thereof, and tightly fitted upon this cylindrical portion of each hub to secure the same against rotation on the respective hub and abutting said shoulder to positively prevent movement of the same rearwardly upon the respective hub is a bored disk 66. The hub 33 has a similar cylindrical portion formed at its rear end which terminates in a rearwardly facing shoulder, and tightly fitted upon this cylindrical portion to secure the same against rotation on the hub and abutting said shoulder to positively prevent movement of the same forwardly upon this hub is a bored disk 67.

The web of the gear 54 is provided with four rectangular apertures 68 disposed around the axis of the gear and spaced substantially equidistant from each other and having their long sides disposed tangentially. See Figs. 3 and 9. The rear face of the web of the gear 54 is ribbed about these apertures to lend strength to the gear and a pair of bosses 69 is provided for each aperture, they being disposed on opposite long sides of the respective aperture and adjacent one end thereof, and the bosses of one pair of diametrically opposite apertures being disposed adjacent the same end of their apertures with relation to a circumferential direction, and the bosses of the other pair of diametrically opposite apertures being disposed adjacent the same end of their apertures with relation to a circumferential direction and being disposed adjacent the ends of these apertures opposite the ends of the one pair at which their bosses are disposed with relation to said circumferential direction. Each pair of bosses are provided with alined bores 70 which are disposed substantially radially with respect to the axis of the gear 54 and consequently substantially radially with respect to the axis of the shaft 5.

A lock arm 71 is provided for each of the above mentioned apertures, and formed at one end of the lock arm and extending laterally from opposite sides thereof is a pair of studs 72, which studs are disposed within respective bores 70 of the respective pair of bosses 69 to provide a pivotal connection between the gear and the lock arm to allow movement of the lock arm on an axis disposed substantially radially with respect to the axis of shaft 5 and consequently substantially radially with respect to the axis of gear 48. Each lock arm 71 is formed of two parallel superposed parts $71^2$ and $71^3$, see Fig. 5, similar in form but left and right handed with respect to each other and joined together on a plane disposed transversely to the axis of the studs 72 thereof and having abutting projections 73 formed at the ends thereof opposite the studs 72 whereby the main portions of these parts, including the ends thereof at which studs 72 are disposed, are separated. Formed on each of the parts 71² and 71³ adjacent the axis of the respective stud 72 and disposed on an axis parallel to but not coincident with the axis of said respective stud and extending oppositely from the respective part with respect to the respective stud 72 is a second stud 74. The studs 74 of each pair of parts 71² and 71³ are so disposed with relation to their respective studs 72 that when the two parts are in proper assembled or superposed relation they are in alinement and their free ends abut to provide spacing members at the pivotal end of the lock arm. The outer surface of each part 71² and 71³ which surrounds the stud 72 is raised slightly above the remainder of this surface as designated at 75, see Figs. 5 and 6, to engage the adjacent face of the respective boss 69 to allow the remainder of said outer surface of these parts to move freely by the adjacent side of the respective aperture 68. In assembling a lock arm upon the gear 54 the stud 72 of one of the parts 71² or 71³ is positioned in its bore 70 and then the other part is inserted in its bore while the parts 71² and 71³ are so related that the studs 74 and projections 73 are out of superposed relation with each other. After both studs 72 are fully engaged with their respective bores the parts are swung into proper superposed relation, after which a pin 76 is inserted into corresponding holes in the two parts, which holes are disposed parallel with studs 72 and pass through projections 73, and the pin is then riveted within the counter-bored outer ends of such holes to fix the assembly.

A spring guide rod 77 is provided for each lock arm and has its one end slidably engaged in an aperture formed in the rib of the side of the respective aperture 68 opposite the side thereof adjacent the respective pair of bosses 69. This rod extends from said rib toward the opposite end of the aperture and terminates in an enlarged portion forming a shoulder 78 facing said rib and an open sided bearing 79 facing oppositely of said rib, which bearing is engaged with the studs 74 of the respective lock arm. A compression spring 80 encircles said rod between said shoulder and rib and abuts the same with its respective ends to maintain said bearing in impelling relation with said studs 74. See Figs. 7, 8, 9, and 10. The studs 74 are so disposed with relation to the axis of the respective lock arm, that is the axis of studs 72, that the spring normally tends to move the lock arm pivotally toward an upright position with respect to the web of the gear 54, the short side 81 of the aperture 68 adjacent the bosses 69 constituting a stop 81 against which the spring 80 normally maintains the adjacent side of the lock arm in substantially upright position with relation to the web of the gear.

Figures 7, 9, 10:
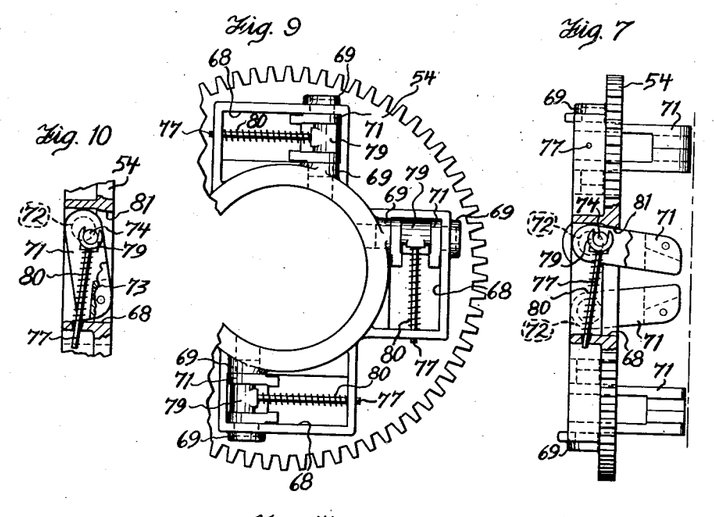
Fig. 7 is an enlarged view in side elevation of one of the gears in assembly with the parts carried thereby, a portion thereof being broken away.
Fig. 9 is a partial view in rear elevation of the mechanism shown in Fig. 7.
Fig. 10 is a partial view similar to Fig. 7 showing a lock arm in unlocked position.

When moved away from said stop 81 against the influence of spring 80 each lock arm is adapted to move within its aperture, as shown in Fig. 10, the projections 73 being formed to provide clearance for the spring 80 and rod 77 when in this position.

Figure 11:
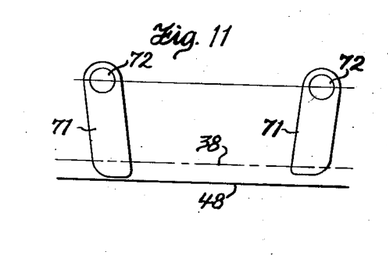
Figs. 11, 12, and 13 are diagrammatical views showing the movements of the lock arms as operating with sliding gear coupling elements.
Figure 12:
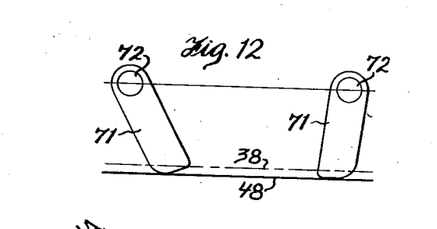
Figure 13:
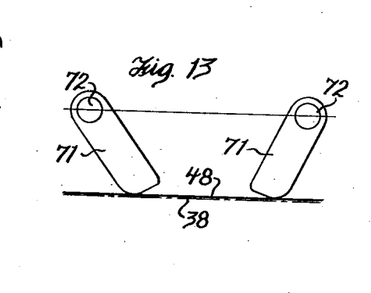

The side of the web of gear 48 facing gear 54 is flat and constitutes a friction surface disposed transversely of the axis thereof, and the free ends of the lock arms 71, when in upright position, extend toward this surface to be frictionally engaged therewith when the gear 48 is moved rearwardly to mesh the same with gear 38, as hereinbefore described. By reason of the fact that, as hereinbefore described, the bosses 69 of one pair of diametrically opposite apertures 68 are disposed adjacent the same ends of their apertures with relation to a circumferential direction, and that the bosses of the other pair of diametrically opposite apertures are disposed adjacent the same ends of their apertures with relation to a circumferential direction and disposed adjacent the ends of their apertures opposite the ends of the one pair of diametrically opposite apertures at which their bosses are disposed with relation to said circumferential direction, and that the stops 81 are disposed in the above described relation with respective bosses, one pair of diametrically opposite lock arms corresponding with one pair of these diametrically opposite apertures may be moved from their upright or locking positions circumferentially in one direction only and away from said friction surface, and the other pair of diametrically opposite lock arms may be moved from their upright or locking positions circumferentially in the opposite direction only and away from said friction surface. The lock arms of one of these pairs are longer, preferably the ones that may be moved circumferentially and away from said friction surface in the direction of rotation of the driving shaft 4, see the arrow in Fig. 1, so that as the gear 48 moves rearwardly, it engages the free ends of this pair of lock arms first and before it engages gear 38 whereby a frictional connection is established between the shafts 4 and 5 prior to the engagement of gear 48 with gear 38. The gear 54 is preferably the same size as gear 48 and by reason of the fact that it meshes with gear 38 it rotates at the speed that the gear 48 does when in mesh with gear 38. Consequently if the gear 48 is rotating substantially at a higher speed than gear 54 and pressure is applied to said gear 48 to move the same rearwardly the frictional engagement thereof with this pair of lock arms, see Fig. 11, will cause the same to pivot in the direction of rotation and move away their upright or locking positions to allow gear 48 to be moved rearwardly further to engage the frictional surface thereof with the other pair of lock arms, see Fig. 12. In this position the longer pair of lock arms are tilted to such an extent that their locking relation with gear 48 is broken and they will move rearwardly freely with the gear 48 regardless of the rotatory speed or direction of the same with relation to gear 54. The frictional surface of gear 48 encounters the other shorter pair of lock arms prior to the time it engages the gear 38 to mesh therewith, and by reason of the fact that this pair of lock arms moves circumferentially and away from their upright or locking positions in a circumferential direction opposite that in which the longer pair of lock arms move away from their locking position the gear 48 must now rotate substantially at a slower rate of speed than gear 54 in order to move these lock arms into unlocked position. Consequently if the gear 48, after operating to unlock the longer lock arms, rotates substantially at a lower speed than gear 54 and the pressure to move gear 48 rearwardly is continued the frictional engagement thereof with this pair of lock arms, it will cause the same to pivot in the direction opposite the direction of rotation gear 48 and with the direction of rotation of gear 48 with relation to gear 54 to move these lock arms from their upright or locking positions, see Fig. 13. In this position both pair of lock arms are tilted to such an extent that their locking relation with gear 48 is broken and they will move rearwardly freely with gear 48 regardless of the relative rotative speeds of gears 48 and 54. This condition arises just prior to the engagement of gear 48 with gear 38 and a slight further movement rearwardly of gear 48 initially engages gear 48 with gear 38 and still farther rearward movement of gear 48 fully meshes the same with gear 38 to establish a positive driving connection therebetween, the lock arms being moved within their respective apertures during this movement, see Fig. 10. In practice the above operations take place in quick succession and the time consumed after the shorter lock arms are moved to unlocking position and the time when the gear 48 initially engages gear 38 is very short as the lock arms are moved from locking to unlocking position within about a quarter of a turn of the gear 48 relatively to gear 54 in the proper direction as above set forth, so that the gear 48 is not running at but a slightly slower or higher speed relatively to gear 54, as the case may be depending upon which pair of lock arms is the longest, when it is initially engaged with gear 38 in any modification of the invention.

Figure 8:
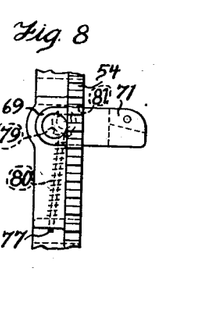
Fig. 8 is a partial view similar to Fig. 7 showing a lock arm of modified design in assembly therewith.

In the modification as shown in Fig. 8 the lock arm 71 is shown in a locked position normal to the plane of gear 54. This locked position necessitates the gear 48 positively running faster and then slower than gear 54 to unlock both pairs of lock arms. However I preferably tilt the lock arms slightly from the normal to the plane of gear 54 in the direction of their circumferential movement away from their upright or locked positions, see Figs. 7 and 11, so that they may be moved from their upright or locked positions when the gears 48 and 54 are rotating in unison, the lock arms providing a lock which is only effective when the relative rotatory speeds of gears 48 and 54 differ appreciably and to such an extent that the meshing or attempted meshing of the same would cause undue clashing or shock and probable injury to the teeth of the same. When the gear 48 is moved rearwardly from its rearward position in mesh with gear 38 the springs 80 move their respective lock arms against the friction surface of gear 48 until the lock arms engage respective stops 81 in their upright or locking positions.

Figures 14, 15:
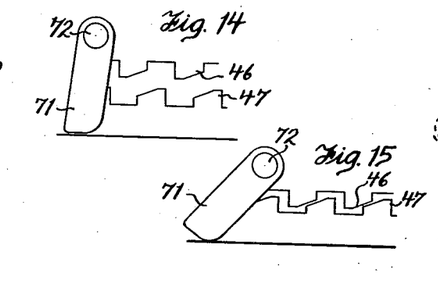

The rear face of gear 57 is flat and forms a friction surface disposed transversely to the axis of this gear, and the rear face of disk 67 is also flat and forms a friction surface disposed transversely of this disk. Each of the disks 66 is provided with a pair of diametrically opposite rectangular apertures 82 having their long sides disposed tangentially. A lock arm 71, similar to the lock arms above described, is mounted in each aperture in a manner similar to the manner in which the lock arms 71 of gear 54 are mounted in the apertures thereof, and is disposed in the same relation to the same adjacent and coacting elements wherefore these same adjacent and coacting parts are given the same reference characters. Therefore I refer to the above description of one pair of lock arms of gear 54 instead of duplicating such description here. The lock arms 71 of disks 66 when in upright or locking position extend toward the friction surfaces of gear 57 and disk 67 respectively to be frictionally engaged therewith when disk 67 or the rear disk 66 is moved toward the adjacent disk 66 or gear 57, see Fig. 14. It will be noted that the teeth 47 of hub 33 and teeth 46 of hub 43 provide an over-running connection between these hubs, and that teeth 60 of hub 58 and teeth 61 of hub 55 provide an over-running connection between these hubs as heretofore described. The lock arms 71 of each disk 66 are mounted so that they may be moved circumferentially and away from their locking positions in a direction opposite the direction of rotation of shaft 4 and hubs 33 and 55. Thus the hubs 33 and 55 must rotate at a substantially slower speed than their respective disks 66 to cause said lock arms to be moved to unlocking position by the frictional engagement thereof respectively with the friction surface of gear 57 or of disk 67. Thus when hub 33 or 55 is rotating faster than its respective hub 43 or 58 it cannot be moved to engage its teeth with those of the opposite hub. However, when the speed of either hub 33 or 55 falls substantially below that of the respective hub 43 or 58 either pair of respective lock arms may be moved to unlocked position by movement of the respective friction surface thereagainst by movement of the respective hub 33 or 55 toward the opposite hub toward tooth engaging position. The respective hub 33 or 55 is then accelerated, if necessary, to fully engage the respective teeth to establish a positive driving connection. See Fig. 15.

As described with relation to gear 54 the lock arms of the disks 66 are moved from their upright or locking position to their unlocking positions prior to the engagement of the related coupling elements with each other. And further the lock arms of disks 66 are preferably tilted from the normal to the plane of these disks in the direction of their circumferential movement away from their upright or locked positions so that they may be moved from their upright or locked positions when the respective hubs are rotating in unison, the lock arms providing a lock which is only effective when the relative rotatory speeds of the respective hubs are in over-running relation and differ appreciably and to such an extent that the engagement of the clutch teeth of the respective pairs of hubs would cause undue clash or shock and probable injury to the teeth.

Arranged below and adjacent the top of the casing 1 are two spaced parallel shafts 85 which are disposed parallel to shafts 4 and 5, and which are mounted for sliding movement in bearings 86 mounted respectively in apertures of the front and rear end walls 2 and 3. The front ends of these shafts have keyways 87 formed thereon which are engaged by pins 88 fixed in bores formed in the casing and respective bearings 86 to prevent rotation of these shafts. Secured at the center of each shaft between the respective bearings 86 is a shifting block 89 having two upstanding projections spaced longitudinally of the respective shaft. Uprising from the center of the top of the casing 1 is an inverted funnel shaped formation 90 at the apex 91 of which a shifter lever 92 is pivotally mounted for universal movement, the said shifter lever extending upwardly from said apex exteriorly of the casing and extending downwardly from said apex and having a spherical formation at its lower end adapted to be positioned between the said projections of either shifter block 89 by transverse pivotal movement of the lever to provide a connection with either shaft 85 to move the same forwardly or rearwardly by movement of the lever 92 rearwardly or forwardly on its pivotal mounting. Formed on the top of the casing below the funnel shaped formation 90 are two spacers 93 arranged in the same vertical plane parallel to shafts 85 and disposed between the same, and lying in the path of the lower end of shifter lever 92. The opposed ends of these spacers are separated to allow the lower end of the shifter lever to pass through said vertical plane to be engaged with either shifting block at one point in the path of the same, but prevent said lower end of the shifter lever moving from engagement with one shifter block into the path of the other shifting blocks at other points on either side of said one point. Surfaces 93' are formed on opposite sides of the funnel shaped formation to be engaged by the lower end of the shifter lever 92 to prevent the same being moved beyond the paths of both shifter blocks. Mounted for sliding movement on each shaft 85 is a shifter fork element 94 arranged on one side of the respective shifter block, and each shifter fork element has a longitudinal extension 95 arranged along the respective shaft in spaced relation therewith and passing by the respective shifter block, and having its end surrounding the respective shaft for sliding movement thereon beyond the shifter block as designated at 96. Each shifter fork element has a shifter fork formed thereon terminating in an arcually shaped end 97 engaging a respective groove 65 of the hubs 43 and 58, the engagement of said arcually shaped end 97 maintaining the shifter fork in proper position and against rotation on the respective shaft 85. A compression spring 98 encircles the shaft 85 upon which the shifter fork element 94, whose end 97 engages groove 65 of hub 43, is mounted, said spring having its opposite ends abutting this shifter fork element and the respective shifter block, and a second compression spring 99 encircles this same shaft and has its opposite ends abutting the end 96 of the longitudinal extension 95 of this shifter fork element and this shifter block. Thus movement of this shifter block in either direction is transmitted to this shifter fork element to shift hub 43 along shaft 5 in either direction through one of the springs 98 or 99, so that in the event that an attempt is made to shift this hub to engage the teeth 46 with teeth 47 or to mesh gear 48 with gear 38 when the respective lock arms 71 are in locked position and the rotatory speeds of the shafts 4 and 5 are not in proper relation to unlock the same the shifter block may nevertheless be moved to the limit of its movement, the respective spring 98 or 99 storing such movement until the hub 43 is allowed to be shifted by the respective lock arms 71. Another compression spring 100 encircles the other shaft 85 upon which the shifter fork element 94 is mounted, the end 97 of whose shifter fork engages groove 65 of hub 58, and has its opposite ends abutting the respective shifter block and the respective end 96 of the longitudinal extension of said shifter fork element. Thus movement of this shifter block forwardly to move hub 58 forwardly to engage teeth 60 with teeth 61 is transmitted to this shifter fork element through spring 100 for the same purpose that the springs 98 and 99 serve. This shifter fork element abuts the opposite side of the respective shifter block whereby positive movement of hub 58 in the opposite direction to effect the meshing of gear 62 with reverse pinion 63 is provided as no locking means is provided for this gearing and a resilient connection to effect this movement would be of little advantage if any. The shifter fork elements 94 and the ends 96 of their extensions are adapted to abut respective bearing 86 to limit the movements thereof, and the spacers 93 are provided with lateral extending stops 101, between respective pairs of which the shifter blocks move, to limit the movement of these blocks. Each of the hubs 43 and 58 is provided with a radial bore disposed to have the outer end thereof closed by the hub of the respective disk 66, see Fig. 1, and disposed within this bore is a ball 102 which is held in engagement with shaft 5 by a compression spring 103 disposed in the bore between the hub of the respective disk 66 and the ball. The shaft 5 is provided with notches 104, three of which are so disposed in the path of each ball and disposed so that the ball will engage the same to provide a yielding lock to prevent accidental movement of the hubs 43 and 58 from their adjusted positions and to overcome the effect of springs 80 acting through respective lock arms to move the hubs 43 and 58 from their coupling positions.

It will be noted that in the above described mechanism I have provided a very simple and efficient mechanism which attains all of the features above set out and which need not to be repeated here as these features are clearly apparent from the above description read in conjunction with the accompanying drawings.

While I have described and shown the invention as embodied in a transmission which is manually manipulated it is obvious that the same may be embodied, with equal advantage, in a transmission mechanism mechanically manipulated or electro-mechanically manipulated, and while I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A device of the character described including independently rotatable driving and driven members provided with interengageable teeth to form a driving connection therebetween and relatively movable to and away from each other to engage and disengage said teeth, and means for preventing movement of said members into tooth engaging position and adapted to be set to be operated to permit movement of said members into tooth engaging position by the relative rotation of said members first in one direction and then in the other direction prior to the engagement of said teeth.

2. A device of the character described including driving and driven members provided with interengageable teeth to form a driving connection therebetween and relatively movable to and away from each other to engage and disengage said teeth, and means preventing movement of said members into tooth engaging position and adapted to be set by initial movement of said members toward tooth engaging position prior to the engagement of said teeth to be operated to permit movement of said members into tooth engaging position by the relative rotation of said members first in one direction and then in the other direction prior to the engagement of said teeth.

3. A device of the character described including independently rotatable driving and driven members provided with interengageable teeth to form a driving connection therebetween and relatively movable to and away from each other to engage and disengage said teeth; and means for preventing movement of said members into tooth engaging posisition and adapted to be set to be operated to permit movement of said members into tooth engaging position by the relative rotation of said members first in one direction and then in the other direction prior to the engagement of said teeth, said means including two locking elements normally in locked position but adapted be moved into unlocked position, one of said locking elements being adapted to be moved in one direction only into unlocked position by the relative rotation of said members in one direction and the other locking element being adapted to be moved into unlocked position in one direction only when the relative rotation of said members is in the opposite direction, the locking element first moved into unlocking position being adapted to be retained in unlocked position until said means is unset.

4. A device of the character described including independently rotatable driving and driven members provided with interengageable teeth to form a driving connection therebetween and relatively movable to and away from each other to engage and disengage said teeth; and means for preventing movement of said members into tooth engaging position and adapted to be set by initial movement of said members toward tooth engaging position prior to the engagement of said teeth to be operated to permit movement of said members into tooth engaging position by the relative rotation of said members first in one direction and then in the other direction prior to the engagement of said teeth, said means including two locking elements normally in locked position but adapted to be moved into unlocked position, one of said locking elements being adapted to be moved in one direction only into unlocked position by the relative rotation of said members in one direction and the other locking element being adapted to be moved into unlocked position in one direction only when the relative rotation of said members is in the opposite direction, the locking element first moved into unlocking position being adapted to be retained in unlocked position until said means is unset.

5. A device of the character described including independently rotatable driving and driven members provided with interengageable teeth to form a driving connection therebetween and relatively movable to and away from each other to engage and disengage said teeth; and means for preventing movement of said members into tooth engaging position and adapted to be set to be operated to permit movement of said members into tooth engaging position by the relative rotation of said members first in one direction and then in the other direction prior to the engagement of said teeth, said means including two locking elements normally in locked position but adapted to be moved into unlocked position, one of said locking elements being adapted to be moved in one direction only into unlocked position by the relative rotation of said members in one direction and the other locking element being adapted to be moved into unlocked position in one direction only when the relative rotation of said members is in the opposite direction, the locking element first moved into unlocking position being adapted to be retained in unlocked position until said means is unset, and yieldable resilient means adapted to move the locking elements into and to normally maintain the same in locked position.

6. A device of the character described including independently rotatable driving and driven members provided with interengageable teeth to form a driving connection therebetween and relatively movable to and away from each other to engage and disengage said teeth; and means for preventing movement of said members into tooth engaging position and adapted to be set by initial movement of said members toward tooth engaging position prior to the engagement of said teeth to be operated to permit movement of said members into tooth engaging position by the relative rotation of said members first in one direction and then in the other direction prior to the engagement of said teeth, said means including two locking elements normally in locked position but adapted to be moved into unlocked position, one of said locking elements being adapted to be moved in one direction only into unlocked position by the relative rotation of said members in one direction and the other locking element being adapted to be moved into unlocked position in one direction only when the relative rotation of said members is in the opposite direction, the locking element first moved into unlocking position, being adapted to be retained in unlocked position until said means is unset, and yieldable resilient means adapted to move the locking elements into and to normally maintain the same in locked position.

7. A device of the character described including independently rotatable driving and driven members provided with interengageable teeth to form a driving connection therebetween and relatively movable to and away from each other to engage and disengage said teeth; and means for preventing relative movement of said members to engage the teeth thereof including one locking element connected to rotate in unison with one of said members and normally in locked position and adapted to move substantially about its axis of rotation in one direction only out of its locked position, a second locking element connected to rotate in unison with one of said members and normally in locked position and adapted to move substatially about its axis of rotation in one direction only out of its locked position, and normally functionless means adapted to be caused to function prior to the engagement of said teeth and adapted, when caused to function, to effect a frictional rotatory connection between said driving and driven members through each locking element and to thereby move the locking elements into unlocking position when the relative rotation of said members is substantially in respective predetermined directions, said locking elements being so arranged that one locking element is moved into unlocking position when the relative rotation of said members is substantially in one direction and that the other locking element is moved into unlocking position when the relative rotation of said members is substantially in the opposite direction, the locking element first moved into unlocked position being adapted to be retained in unlocked position until said frictional connection is rendered functionless.

8. A device of the character described including independently rotatable driving and driven members provided with interengageable teeth to form a driving connection therebetween and relatively movable to and away from each other to engage and disengage said teeth; and means for preventing relative movement of said members to engage the teeth thereof including one locking element connected to rotate in unison with one of said members and normally in locked position and adapted to move substantially about its axis of rotation in one direction only out of its locked position, a second locking element connected to rotate in unison with one of the said members and normally in locked position and adapted to move substantially about its axis of rotation in one direction only out of its locked position, and normally functionless means adapted to be caused to function prior to the engagement of said teeth and adapted, when caused to function, to effect a frictional rotatory connection between said driving and driven members through each locking element and to thereby move the locking elements into unlocking position when the relative rotation of said members is substantially in respective predetermined directions, said locking elements being so arranged that one locking element is moved into unlocking position when the relative rotation of said members is substantially in one direction and that the other locking element is moved into unlocking position when the relative rotation of said members is substantially in the opposite direction, the locking element first moved into unlocked position being adapted to be retained in unlocked position until said frictional connection is rendered functionless, and yieldable resilient means adapted to move the locking element into and to normally maintain the same in locked position.

9. A device of the character described including independently rotatable driving and driven members provided with interengageable teeth to form a driving connection therebetween and relatively movable to and away from each other to engage and disengage said teeth; and means for preventing relative movement of said members to engage the teeth thereof including one locking element connected to rotate in unison with one of said members and fixed with one of said members as to the relative to and away movement of said members when in locked position and normally in locked position and adapted to move substantially about its axis of rotation in one direction only out of its locked position, a second locking element connected to rotate in unison with one of said members and fixed with one of said members as to the relative to and away movement of said members when in locked position and normally in locked position and adapted to move substantially about its axis of rotation in one direction only out of its locked position, and normally functionless means adapted to be caused to function upon initial movement of said members toward tooth engaging position and prior to the engagement of said teeth and adapted, when caused to function, to effect a frictional rotatory connection between said driving and driven members through each locking element and to thereby coöperate with each locking element to prevent movement of said members into tooth engaging position when the locking element is in locked position and adapted to move the locking elements into unlocked positions when the relative rotation of said members is substantially in respective predetermined directions, said locking elements being so arranged that one locking element is moved into unlocked position when the relative rotation of said members is in one direction and that the other locking element is moved into unlocked position when the relative rotation of said members is in the opposite direction, and yieldable resilient means adapted to move the locking elements into locked position and to normally maintain the same in locked position, the locking element first moved into unlocked position being adapted to be retained therein until said frictional connection is rendered functionless.

10. A device of the character described including a rotatable spur gear; a second rotatable spur gear disposed on an axis parallel with the axis of said first mentioned gear and adapted to mesh therewith, one of said gears being movable longitudinally of its axis to mesh and unmesh the teeth thereof with the teeth of the other gear; and means for preventing relative movement of said first and second mentioned gears to mesh the teeth thereof including a third rotatable spur gear disposed substantially coaxial with said second gear and constantly in mesh with said first mentioned gear, a locking element normally in locked position and mounted to rotate in unison with one of said coaxial gears and movable therewith into unlocking position substantially about the axis of rotation in one direction only, a second locking element normally in locked position and mounted to rotate in unison with one of said coaxial gears and movable therewith into unlocking position substantially about the axis of rotation thereof in one direction only, and normally functionless means adapted to be caused to function prior to the meshing of said first and second mentioned gears and adapted, when caused to function, to effect a frictional rotatory connection between said coaxial gears through each locking element and to move thereby said locking elements into unlocking position when the relative rotation of said coaxial gears is substantially in respective predetermined directions, said locking elements being so arranged that one locking element is moved into unlocking position when the relative rotation of said coaxial gears is substantially in one direction and the other locking element being so arranged that it is moved into unlocking position when the relative rotation of said coaxial gears is substantially in the opposite direction, the locking element first moved into locking position being adapted to be retained therein until said means is rendered functionless and yieldable resilient means adapted to move the locking elements into and to normally maintain the same in locked position.

11. A device of the character described including a rotatable spur gear; a second rotatable spur gear disposed on an axis parallel with the axis of said first mentioned gear and adapted to mesh therewith, one of said gears being movable longitudinally of its axis to mesh and unmesh the teeth thereof with the teeth of the other gear; and means for preventing relative movement of said first and second mentioned gears to mesh the teeth thereof including a third rotatable spur gear disposed substantially coaxial with said second gear and constantly in mesh with said first mentioned gear, a locking element normally in locked position and mounted to rotate in unison with one of said coaxial gears when in locked position and adapted to move substantially about its axis of rotation in one direction only out of its locked position, a second locked element normally in locked position and mounted to rotate in unison with one of said coaxial gears and adapted to move substantially about its axis of rotation in one direction only out of its locked position, and normally functionless means adapted to be caused to function prior to the meshing of said first and second mentioned gears and adapted, when caused to function, to effect a frictional rotatory connection between said coaxial gears through each locking element and to thereby coöperate with each locking element to prevent movement of said members into tooth engaging position when the locking element is in locked position and adapted to move the locking elements into unlocked positions when the relative rotation of said coaxial gears is substantially in respective predetermined directions, said locking elements being so arranged that one locking element is moved into unlocking position when the relative rotation of said coaxial gears is substantially in one direction and the other locking element being so arranged that it is moved into unlocking position when the relative rotation of said coaxial gears is substantially in the opposite direction, the locking element first moved into unlocked position being adapted to be retained in its unlocked position until said frictional connection is rendered functionless.

12. A device of the character described including independently rotatable driving and driven members provided with interengageable teeth to form a driving connection therebetween and relatively movable to and away from each other to engage and disengage said teeth; and means for preventing relative movement of said members to engage the teeth thereof including a circular friction surface rotated on its axis in unison with one member and normally functionless, but adapted to be caused to function, one movable locking element normally in locked position and driven in unison with the other member and adapted when in locked position to be frictionally engaged with said friction surface during the functioning thereof to establish a frictional rotatory connection between said members prior to the engagement of said teeth of the one member with the teeth of the other member, said locking member being arranged to be moved into unlocked position by said friction surface when the relative rotation of said members is substantially in over-running relation, and a second movable locking element normally in locked position and also driven in unison with said other member and adapted, when in locked position, to be frictionally engaged with said friction surface during the functioning thereof to establish a frictional rotatory connection between said members prior to the engagement of said teeth of the one member with the teeth of the other member, said second locking element being arranged to be moved into locked position by said friction surface when the relative rotation of said members is substantially in under-running relation, the locking element first moved into unlocked position being adapted to be retained in unlocked position until said friction surface is rendered functionless.

13. A device of the character described including independently rotatable driving and driven members provided with interengageable teeth to form a driving connection therebetween and relatively movable to and away from each other to engage and disengage said teeth and means for preventing relative movement of said members to engage the teeth thereof including a friction circular surface rotating on its axis in unison with one member and connected therewith as to said movement of the members to and away from each other and normally functionless but adapted to be caused to function by initial movement of said members toward tooth engaged position and prior to the engagement of said teeth, one movable locking element normally in locked position and driven in unison with the other member and fixed therewith when in locked position as to said movement of the members to and away from each other and adapted, when in locked position, to be frictionally engaged by said friction surface during the functioning thereof to establish a frictional rotatory connection between said members prior to the engagement of said teeth of the one member with said teeth of the other member, said locking element being arranged to be moved into unlocked position by said friction surface when the relative rotation of said members is substantially in over-running relation, and a second movable locking element normally in locked position and also driven in unison with said other member and fixed therewith when in locked position as to said movement of the members to and away from each other and adapted, when in locked position, to be frictionally engaged by said friction surface during the functioning thereof to establish a frictional rotatory connection between said members prior to the engagement of said teeth of the one member with the teeth of the other member, said second locking element being arranged to be moved into unlocked position by said friction surface when the relative rotation of said members is substantially in under-running relation, the locking element first moved into unlocked position being adapted to be retained in unlocked position until said friction surface is rendered functionless.

14. A device of the character described including independently rotatable driving and driven members provided with interengageable teeth to form a driving connection therebetween and relatively movable to and away from each other to engage and disengage said teeth and means for preventing relative movement of said members to engage the teeth thereof including a normally functionless circular friction surface disposed transversely of its axis and driven in unison with one of said members, one movable locking element normally in locked position and driven in unison with the other member on an axis substantially alined with the axis of said friction surface and mounted for movement out of locking position in one direction only about such axis, said locking element being adapted, when in locked position, to be frictionally engaged with said friction surface during the functioning of the same therewith to establish a frictional rotatory connection between said members prior to the engagement of said teeth of the one member with the teeth of the other member, said locking element being arranged to be moved into unlocked position by said friction surface when the relative rotation of said members is substantially in over-running relation, and a second movable locking element also driven in unison with said other member on an axis substantially alined with the axis of said friction surface and mounted for movement out of locking position in one direction only about such axis, said second locking element being adapted, when in locked position, to be frictionally engaged with said friction surface during the functioning of the same therewith to establish a frictional rotatory connection between said members prior to the engagement of said teeth of the one member with the teeth of the other member, said second locking element being arranged to be moved into unlocked position by said friction surface when the relative rotation of said members is substantially in under-running relation, the locking element first moved into unlocked position being adapted to be retained in unlocked position until said friction surface is rendered functionless.

15. A device of the character described including independently rotatable driving and driven members provided with interengageable teeth to form a driving connection therebetween and relatively movable to and away from each other to engage and disengage said teeth; and means for preventing relative movement of said members to engage the teeth thereof including a normally functionless circular friction surface disposed transversely of its axis and driven in unison with one of said members and connected therewith as to said to and away movement, one movable locking element normally in locked position and driven in unison with the other member on an axis substantially alined with the axis of said friction surface and connected with said other member as to said to and away movement and mounted for movement out of locking position in one direction only about such axis, said locking element being adapted, when in locked position, to be frictionally engaged with said friction surface during the functioning thereof to establish a frictional rotatory connection between said members prior to the engagement of said teeth of the one member with the teeth of the other member, said locking member being arranged to be moved into unlocked position by said friction surface when the relative rotation of said members is substantially in over-running relation, and a second movable locking element normally in locked position and also driven in unison with said other member on an axis substantially alined with the axis of said friction surface and connected with said other member as to said to and away movement and mounted for movement out of locking position in one direction only about such axis, said second locking element being adapted, when in locked position, to be frictionally engaged with said friction surface during the functioning thereof to establish a frictional rotatory connection between said members prior to the engagement of said teeth of the one member with the teeth of the other member, said second locking member being arranged to be moved into unlocked position by said friction surface when the relative rotation of said members is substantially in under-running relation, said friction surface and said locking elements being so arranged that said friction surface is caused to function by relative movement of said members toward tooth engaging position and prior to the engagement of said teeth, the locking element first moved into unlocked position being adapted to be retained in unlocked position until said friction surface is rendered functionless.

16. A device of the character described including two coaxial independently rotatable elements adapted for relative movement along their axis to and away from each other, one element having a circular friction surface disposed transversely of its axis, said friction surface being normally functionless but adapted to be caused to function by initial relative movement of said elements in one direction along their axis; a lock arm pivoted at its one end upon the other element on an axis faced by said friction surface and disposed substantially radially with relation to the axis of said friction element, the other end of said lock arm being disposed to be engaged by said friction surface during the functioning thereof; a stop on said other element disposed to be engaged by said lock arm to prevent pivotal movement thereof in one direction from a substantially upright friction surface engaging position to establish a lock to prevent relative movement of the two elements along their axis in said one direction during relative rotation thereof in one direction; a second lock arm pivoted at its one end upon said other element on an axis faced by said friction surface and disposed substantially radially with relation to the axis of said friction element, the other end of said second lock arm being disposed to be engaged by said friction surface during the functioning thereof; a second stop on said other element disposed to be engaged by said second lock arm to prevent pivotal movement thereof from a substantially upright friction surface engaging position in a direction, opposite that from which first mentioned lock arm is prevented from pivotal movement by said first mentioned stop, to establish a second lock to prevent relative movement of the two elements along their axis in said one direction during relative rotation thereof in a direction opposite the relative rotation thereof in said direction, the lock arm first moved into unlocked position being adapted to be retained in unlocked position until said friction surface is rendered functionless; and yieldable resilient means for moving said lock arms into and normally maintaining the same in locked position against their respective stops.

17. A device of the character described including two coaxial independently rotatable elements adapted for relative movement along their axis to and away from each other, one element having a circular friction surface disposed transversely of its axis, said friction surface being normally functionless but adapted to be caused to function by initial relative movement of the said elements in one direction along their axis; a lock arm pivoted at its one end upon the other element on an axis faced by said friction surface and disposed substantially radially with relation to the axis of said friction element, the other end of said lock arm being disposed to be engaged by said friction surface during the functioning thereof; a stop on said other element disposed to be engaged by said lock arm to prevent pivotal movement thereof in one direction from a substantially upright friction surface engaging position to establish a lock to prevent relative movement of the two elements along their axis in said one direction during relative rotation thereof in one direction; a second lock arm pivoted at its one end upon said other element on an axis faced by said friction surface and disposed substantially radially with relation to the axis of said friction element, the other end of said second lock arm being disposed to be engaged by said friction surface during the functioning thereof; a second stop on said other element disposed to be engaged by said second lock arm to prevent pivotal movement thereof from a substantially upright friction surface engaging position in a direction, opposite that from which said first mentioned lock arm is prevented from pivotal movement by said first mentioned stop, to establish a second lock to prevent relative movement of the two elements along their axis in said one direction during relative rotation thereof in a direction opposite the relative rotation thereof in said one direction, the said other ends of said lock arms being so disposed that when both lock arms are engaged with their respective stops in upright position said other end of the one lock arm is a greater distance from said friction surface than said other end of the other lock arm and is not engaged by said friction surface until the lock established by the other lock arm is broken; and yieldable resilient means adapted to move the locking elements into and to normally maintain the same in locked position.

18. A device of the character described including independently rotatable driving and driven members provided with interengageable teeth and movable to and away from each other to engage and disengage said teeth, said teeth being formed to provide an over-running connection; normally functionless circular friction surface disposed transversely of the axis thereof and having connection with one of said members to rotate in unison therewith and fixed therewith as to said to and away movement and adapted to be caused to function upon initial movement of said members toward tooth engaging position prior to the engagement of said teeth; a movably mounted locking member normally in locked position and having connection with the other member to rotate in unison therewith and fixed therewith as to said to and away movement and adapted, when in locked position, to be frictionally engaged with said friction surface during the functioning thereof prior to the engagement of said teeth and adapted to be moved in one direction only to unlocked position by said friction element when the relative rotation of said members is under-running; a shifting element; and a connection between said shifting element and one of said members including a resilient element to effect movement of said members into tooth engaging position through said resilient element.

19. A device of the character described including independently rotatable driving and driven members provided with interengageable teeth to form a driving connection therebetween and relatively movable to and away from each other to engage and disengage said teeth; means for preventing relative movement of said members to engage the teeth thereof including one locking element connected to rotate in unison with one of said members and fixed with one of said members as to the relative to and away movement of said members when in locked position and normally in locked position and adapted to move substantially about its axis of rotation in one direction only out of its locked position, a second locking element connected to rotate in unison with one of said members and fixed with one of said members as to the relative to and away movement of said members when in locked position and normally in locked position and adapted to move substantially about its axis of rotation in one direction only out of its locked position, and normally functionless means adapted to be caused to function upon initial movement of said members toward tooth engaging position and prior to the engagement of said teeth and adapted, when caused to function, to effect a frictional rotatory connection between said driving and driven members through each locking element and to thereby coöperate with the locking element to prevent movement of said members into tooth engaging position when either locking element is in locked position and adapted to move the locking elements into unlocked positions when the relative rotation of said members is substantially in respective predetermined directions, said locking elements being so arranged that one locking element is moved into unlocked position when the relative rotation of said members is in one direction and that the other locking element is moved into unlocked position when the relative rotation of said members is in the opposite direction, the locking element first moved into unlocked position being adapted to be retained therein until said frictional connection is rendered functionless; a shifting element; and a connection between said shifting element and one of said members including a resilient element to effect movement of said members into tooth engaging position through said resilient element.

In witness whereof I hereunto affix my signature this 12th day of March, 1919, A. D.

ROBERT FRANK MIEHLE, Jr.